Oct. 30, 1928.
V. G. VAUGHAN
THERMOSTATIC DEVICE
Filed Sept. 30, 1927
1,689,809
2 Sheets-Sheet 1
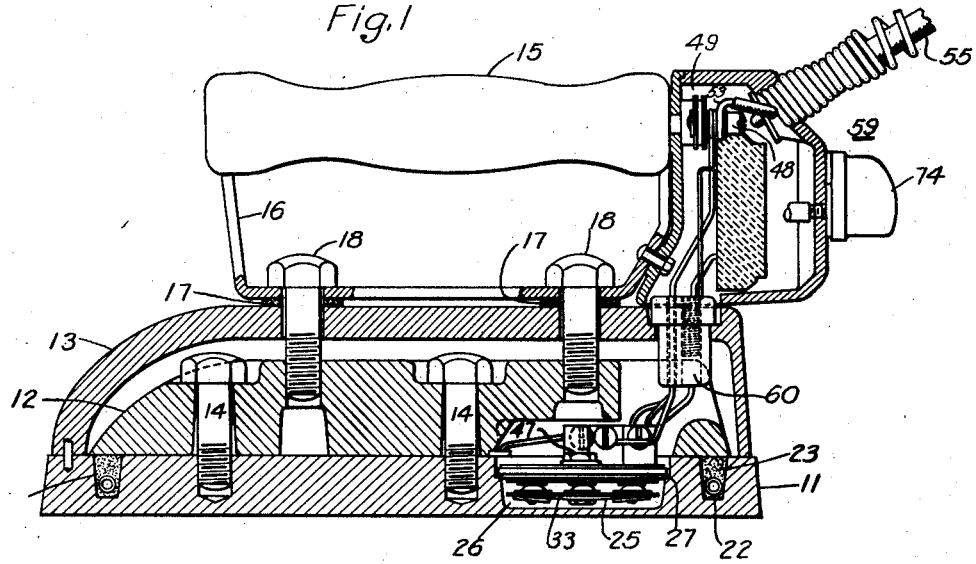
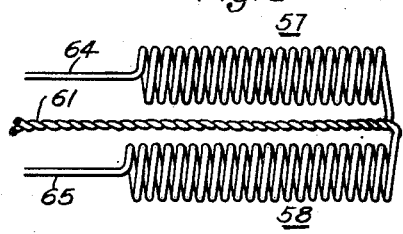
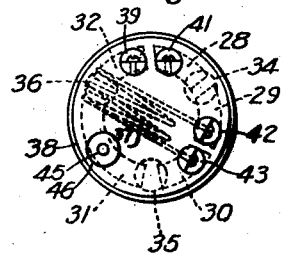
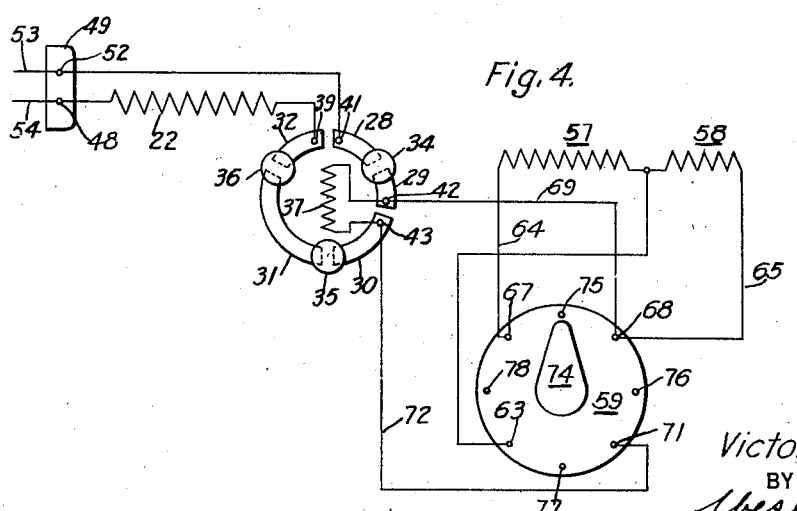
INVENTOR
Victor G. Vaughan
BY
Wesley Sloan
ATTORNEY Oct. 30, 1928.
V. G. VAUGHAN
THERMOSTATIC DEVICE
Filed Sept. 30, 1927
1,689,809
2 Sheets-Sheet 2
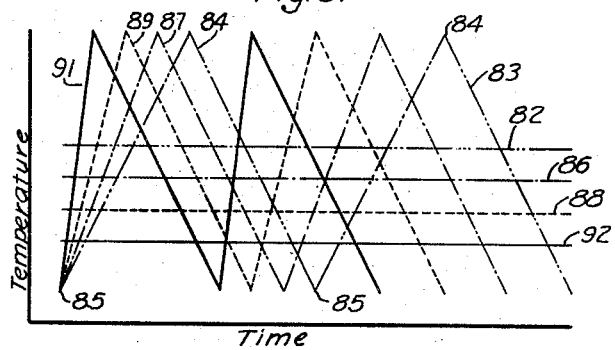
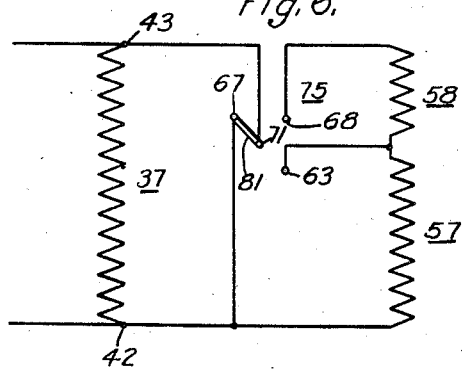
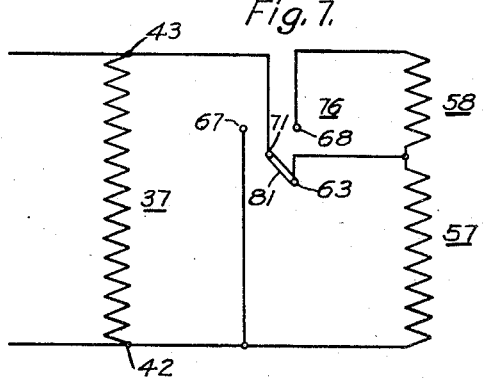
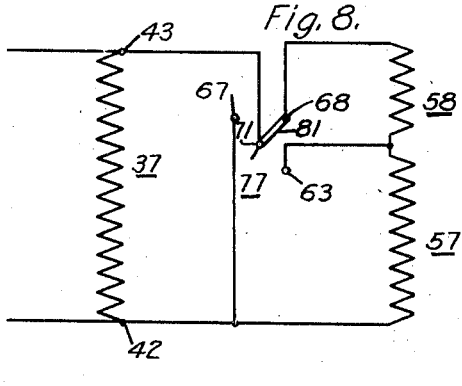
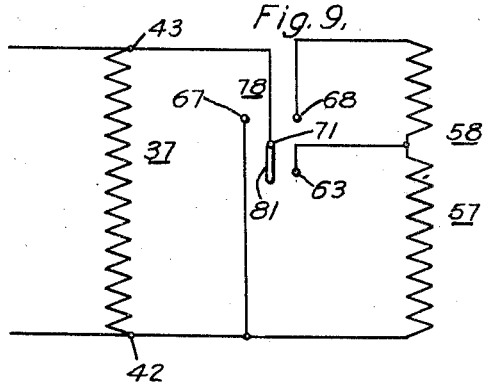
INVENTOR
Victor G. Vaughan
BY
ATTORNEY Patented Oct. 30, 1928.

1,689,809

UNITED STATES PATENT OFFICE.

VICTOR G. VAUGHAN, OF MANSFIELD, OHIO, ASSIGNOR TO WESTINGHOUSE ELECTRIC & MANUFACTURING COMPANY, A CORPORATION OF PENNSYLVANIA.

THERMOSTATIC DEVICE.

Application filed September 30, 1927. Serial No. 222,977.

My invention relates to a thermostatic device and particularly to means for regulating the frequency of operation thereof.

An object of my invention is to provide means for regulating the temperature of a heated device equipped with a heating unit having a substantially constant heat generating capacity.

Another object of my invention is to provide a thermostatic control system for heated devices that shall regulate the length of time, during which a substantially constant quantity of heat energy is being developed, in accordance with the temperature of the heated device, and A further object of my invention is to provide a thermostatic control system that shall be simple in construction, reliable in its operation and easily manufactured and installed.

In practicing my invention, I provide a device to be heated, a heating means therefor, having a substantially constant heat-generating capacity, a thermostat for controlling the heating means, and means for controlling the frequency of operation of the thermostat, whereby the temperature of the device to be heated may be varied over a relatively wide range of temperatures.

For a fuller understanding of my invention, reference may be had to the following description taken in conjunction with the accompanying drawings, in which;

Figure 1 is a view in vertical section of an electrically heated, thermostatically-controlled flat iron, Fig. 2 is a view of a resistor element for controlling the frequency of operation of a thermostat embodied in the device illustrated in Fig. 1, Fig. 3 is a view of circuits and apparatus embodying my invention, Fig. 4 is a top plan of a thermostatic switch embodied in the device shown in Fig. 1, Fig. 5 illustrates the temperature-time characteristics corresponding to the various heat-controlling positions of the switch illustrated schematically in Fig. 3, Fig. 6 is a view illustrating schematically the circuit connections of a heating element for a thermostatic switch embodied in the device illustrated in Fig. 1 when the device is operated at its maximum temperature.

Fig. 7 is a view illustrating schematically the circuit connections of a resistor element and the heating element for the thermostatic switch, when the device illustrated in Fig. 1 is operated at a temperature slightly lower than the maximum temperature.

Fig. 8 is a schematic illustration of circuit connections of the resistor element of Fig. 2 and the heating element for the thermostatic switch embodied in the device as shown in Fig. 1, when the flat iron is operating at a medium temperature; and Fig. 9 is a view illustrating the resistor element of Fig. 2 disconnected from the heating element for the thermostatic switch when the device in Fig. 1 is operating at its minimum temperature.

In Fig. 1 of the drawings a flat iron, for tailoring purposes, is illustrated that comprises a sole plate 11, a weight casting 12 and a cover 13 for enclosing the weight casting. The weight casting may be secured to the sole plate by studs 14 that have screw-thread engagement with the sole plate. The cover may be provided with a handle 15 that is supported by a strap 16 of substantially U-shape. The strap 16 may be thermally insulated from the cover 13 by washers 17 of insulating material. The strap 16 and the cover 13 may be secured firmly in place by means of stud bolts 18 that extend through the washers 17, the cover 13 and into the weight casting 12, with which they have screw-thread engagement.

The sole plate 11 is provided with an annularly-disposed groove 21 into which a heating resistor element 22 may be located. The heating element may be insulated from the sole plate by insulation 23 of suitable material.

The temperature of the sole plate 11 may be controlled by a thermostatic switch 25 that is disposed in an annular recess 26, located at the rear end of the sole plate 11.

The thermostatic switch 25 comprises a base 27 having a plurality of spaced arcuate contact members 28 to 32, inclusive, mounted on the bottom face thereof, a snap acting bimetallic disc 33 having a plurality of spaced contact bridging members 34, 35 and 36 attached thereto along the periphery thereof for bridging the arcuate contact members, and a heating resistance element 37 attached to the top face of the base 27, the resistance element being placed between sheets of insulation 38 in order to insulate it from the base.

The contacts 28, 29, 30 and 32 are provided with terminals 39, 41, 42 and 43 respectively, having portions that extend through the sheets 38, the base and the contacts in order to secure the heating unit and the contacts securely against the base. The contact 31 may be secured to the base by means of a rivet 45 and a washer 46. The terminals of the resistance element 37 may be electrically connected to the terminals 42 and 43, thus connecting the contacts 29 and 30 in series with each other.

The thermostatic disc 33 is preferably of the type disclosed in U. S. Patent No. 1,448,240 to J. A. Spencer, that is adapted to change its shape abruptly when subjected to a temperature of one value and to return abruptly to its initial or normal shape when subjected to a temperature of a different value. Thus, the disc has two opposite limiting positions corresponding to two different temperatures, the difference between which may be designated as the temperature differential of the disc, which differential may be varied between relatively wide limits, depending upon the material constituting the disc and the method used in the manufacture thereof.

In order that the contact-bridging members 34, 35 and 36 may cooperate with the stationary contacts 28 to 32, inclusive, the disc is secured to one end of a stud bolt 47 that has screw-thread engagement with the base 27. By means of the stud bolt, the pressure between the bridging contact members and the arcuate contact members cooperating therewith, when the thermostatic switch 25 is in its circuit-closing position, may be varied or adjusted to a predetermined value.

The electrical connection between the resistance element 22 and the switch 25 is shown schematically in Fig. 4 of the drawings. One end of the resistance element 22 is connected to a terminal 48 that is insulatedly mounted on a terminal supporting member 49, and the other end thereof is connected to the terminal 39 of the switch 25. The terminal 41 of the switch 25 is connected to a terminal 52 insulatedly mounted on the terminal supporting member 49. The terminals 48 and 52 may be connected to a source of electromotive force by conductors 53 and 54 that may be located within a flexible conduit 55 (see Fig. 1).

In order that the temperature of the sole plate 11 may be varied between predetermined limits; for example, between the temperature limits constituting the temperature differential of the disc, a plurality of resistance elements 57 and 58 and a snap switch 59 having a plurality of circuit-controlling positions are provided for regulating the amount of current traversing the heating element 37 for the thermostatic switch 25. The resistance elements may be supported by a bushing 60 of insulating material.

Adjacent ends of the resistance elements 57 and 58 may be twisted together to form a common terminal 61. The common terminal may be connected to a terminal 63 of the switch 59 and the terminals 64 and 65 of the elements 57 and 58 may be connected to terminals 67 and 68, respectively, of the selector switch 59. The terminal 42 of the thermostatic switch 25 is connected to the switch terminal 68 by a conductor 69, and the terminal 43 is connected to a terminal 71 of the switch 59 by a conductor 72.

When a handle 74 of the switch 59 is moved successively to positions 75 to 78, inclusive, the heat-generating capacity of the heating element 37 is so varied that the sole plate may be controlled at four average temperatures of predetermined values. Thus, when the handle 74 is in the position 75, the sole plate is controlled at a maximum average temperature, in position 76 at a lower temperature, in position 77 at a still lower temperature, and in the position 78 at a minimum temperature.

The circuit connections of the resistance elements 57 and 58, and the heating element 37 are shown in Figs. 6 to 9, inclusive, for the various heat controlling positions 75 to 78, inclusive, of the switch 59. In Fig. 6 the circuit connection is illustrated when the switch handle is in the position 75. In this position the heating element 37 is short-circuited by a switch blade 81 that connects the terminals 67 and 71 of the switch 59, and the temperature of the sole plate is regulated at its maximum average temperature, as indicated by a horizontal line 82 in Fig. 5. When the sole plate is controlled at this temperature, the disc 33 is heated substantially in accordance with a time temperature curve 83 of Fig. 5, points 84 representing the temperature at which the switch is actuated to its open circuit position to effect deenergization of the heating element 22, and points 85 representing the temperature at which the switch is actuated to a circuit-closing position to effect reenergization of the heating element 22.

If the handle 74 of the switch is moved to the position 76, the switch connects resistance element 57 in parallel with the heating element 37, terminals 71 and 63 being connected together. Thus, the rate of heating of the switch 25 is so increased that the frequency of operation is raised, thereby causing the resistance element 22 in the sole plate 11 to be energized for a shorter period of time. Since the mass to be heated in the thermostatic switch 25 remains constant, the time of cooling from points 84 to 85 remains substantially constant; therefore, the sole plate is caused to be controlled at an average temperature represented by a line 86 of Fig. 5. Curve 87 of Fig. 5 represents graphically the rate of heating and cooling the switch 25 when the handle 74 of the switch 59 is in the temperature controlling position 76.

If the switch handle 74 is moved to the position 77, the resistance elements 57 and 58 are connected in series with each other and in parallel circuit relation to the heating element 37 of the switch 25. Thus, more current is caused to flow through the element 37 than in either of the switch positions 76 and 75, and the rate of heating the switch 25 and the frequency of operation thereof are increased still further, thereby causing the sole plate to be controlled at an average temperature represented by a curve 88. The rate of heating the switch 25 for this temperature-controlling position is represented graphically by a curve 89.

If the switch handle 74 is moved to the temperature-controlling position 78, the resistance elements 57 and 58 are disconnected from the heating element 37, thereby connecting the element 37 directly in series with the heating element 22 in the sole plate 11. With this circuit connection, the heating element 37 is generating heat at its maximum capacity and the frequency of operation of the switch 25 increased still further as shown by a curve 91 of Fig. 5. The temperature of the sole plate corresponding to this heating position may be represented by a line 92 of the same figure.

The range of temperatures over which the sole plate is controlled, may be varied between relatively wide limits, by making the heat-generating capacity of the element 37 quite large and then providing means similar to the switch 59 and the resistance elements 57 and 58 for varying or controlling the amount of current traversing the element 37. Generally stated the greater the rate of heating of the thermostatic switch 25, the greater will be the frequency of operation thereof; the greater the frequency of operation, the lower will be the temperature at which the sole plate 11 is controlled and the lower the frequency of operation of the thermostatic switch 25, that is, by decreasing the rate of heating thereof, the higher will be the temperature at which the sole plate is controlled.

Various modifications may be made in the device embodying my invention without departing from the spirit and the scope thereof. I desire, therefore, that only such limitations shall be placed thereon as are imposed by the prior art and the appended claims.

I claim as my invention:

1. In combination, a thermostatic switch normally operable to a plurality of current-controlling positions, in response to a relatively large temperature differential, a heating element for heating said switch and means for controlling the energy input to said heating element whereby the frequency of operation of said switch may be varied in accordance with a thermal condition of a predetermined value to be controlled by said switch.

2. In a heating system, a primary source of heat, thermostatic means responsive thereto for controlling said source, and means for controlling the frequency of operation of said switch whereby the temperature affected by said source may be selectively controlled.

3. In a heating system, a primary source of heat, thermostatic means responsive to a thermal condition affected thereby for controlling said sources, an auxiliary source of heat for heating said thermostatic means, and means for controlling said auxiliary source of heat.

4. In a heating system, a primary source of heat, a thermostatic device for controlling said primary source, in accordance with a thermal condition to be affected thereby, an auxiliary source of heat controlled by said switch for heating said switch, and means for controlling the energy of said auxiliary source of heat, whereby the frequency of operation of said thermostatic device is controlled.

5. In a heating system, the combination with a device to be heated, a primary heating element for heating the device, a thermostatic switch operable when said device has been heated to one temperature to deenergize said heating element and at another temperature to energize said element, an auxiliary heating element for heating the switch and means for passing an electric current therethrough, of means for controlling the heat generated by the auxiliary heating element comprising a plurality of resistor elements connected to the auxiliary heating element and a selector switch for varying the circuit connections between the auxiliary heating element and the resistors whereby the rate of heating of said switch by said auxiliary heating element may be controlled.

6. The combination with a thermostat, an electric circuit controlled thereby in accordance with a thermal condition to be controlled and a heating element disposed in thermal relation to said thermostat and controlled thereby, of means for controlling the value of current traversing the heating element comprising a plurality of resistor elements and a selector switch for varying the circuit connections of said resistor elements to said heating element.

7. The combination with a thermostat, of an electric circuit controlled thereby in accordance with a thermal condition to be controlled and a heating element connected in series with said switch and disposed in thermal relation therewith, of means for varying the current flowing through the heating element between zero and a predetermined value, whereby the frequency of operation of said switch may be controlled, said means comprising a plurality of resistor elements, and a selector switch for varying the amount of said resistance elements connected in shunt with said heating element.

In testimony whereof, I have hereunto subscribed my name this 21 day of Sept., 1927.

VICTOR G. VAUGHAN.